(12) United States Patent
Wang et al.

(10) Patent No.: US 8,494,279 B2
(45) Date of Patent: Jul. 23, 2013

(54) METHOD AND SYSTEM FOR INFORMATION PROCESSING AND A HANDWRITING INPUT TERMINAL

(75) Inventors: Yuhui Wang, Shenzhen (CN); Guohua Liu, Shenzhen (CN)

(73) Assignee: Julong Educational Technology Co., Ltd., Shenzhen, Guangdong (CN)

( * ) Notice: Subject to any disclaimer, the term of this patent is extended or adjusted under 35 U.S.C. 154(b) by 718 days.

(21) Appl. No.: 12/776,222

(22) Filed: May 7, 2010

(65) Prior Publication Data

US 2010/0290706 A1 Nov. 18, 2010

(30) Foreign Application Priority Data

May 13, 2009 (CN) .......................... 2009 1 0107328

(51) Int. Cl.
*G06K 9/00* (2006.01)
(52) U.S. Cl.
USPC ........................................................ 382/189
(58) Field of Classification Search
None
See application file for complete search history.

(56) References Cited

U.S. PATENT DOCUMENTS 6,330,231 B1 * 12/2001 Bi ................................. 370/328
7,292,226 B2 * 11/2007 Matsuura et al. ............. 345/168

\* cited by examiner

*Primary Examiner* — Matthew Bella
*Assistant Examiner* — Elisa Rice
(74) *Attorney, Agent, or Firm* — Hamre, Schumann, Mueller & Larson, P.C.

(57) ABSTRACT

The present invention relates to a method for processing information, an information processing system, and a handwriting input terminal. Said information processing system can operate in a handwriting input mode or a click input mode. Such system comprises a plurality of handwriting input terminals, and a data processing center communicatively connected with handwriting input terminals via a transceiver. Said method comprises following steps: S1: configuring a handwriting recognition module and a click position coordinate-key mapping module for the information processing system; S2: receiving information about working mode selection of the information processing system; S3: the handwriting input terminal receives and processes handwriting input signals to obtain coordinate information; S4: selecting the handwriting recognition module or click position coordinate-key mapping module to transform the coordinate information into corresponding character or key information based on the selected working mode. The implementation of the present invention combines the functions of handwriting panel and voting machine (or answering machine), thus achieving either handwriting function or answering function of conveniently sending numbers, letters and symbols of voting machine.

5 Claims, 15 Drawing Sheets

METHOD AND SYSTEM FOR INFORMATION PROCESSING AND A HANDWRITING INPUT TERMINAL

FIELD OF THE INVENTION

The present invention relates to information processing of computer, and more specific, to a method and system for information processing and a handwriting input terminal.

BACKGROUND OF THE INVENTION

As the handwriting input terminal of a computer, the existing handwriting pads and handwriting screens mainly simulate mouse to achieve functions of writing and computer manipulation rather than functions of conveniently sending number and letter provided by a voting machine. For existing handwriting pads, one handwriting pad is used to match one computer specifically. One computer is not capable of simultaneously receiving and processing signals sent by a plurality of handwriting pads, as well as supporting a plurality of handwriting pads to operate simultaneously. Moreover, existing voting machines (or answering machine) are commonly used for answering choice questions, which are only capable of sending signals of numbers, characters and some specific commands, rather than performing writing operations.

1. Existing handwriting pads do not possess functions of conveniently sending number and letter provided by a voting machine;
2. Existing techniques can't use a computer to implement simultaneously receiving and processing signals from a plurality of handwriting pads, as well as supporting a plurality of handwriting pads to operate simultaneously;
3. Voting machines of current techniques are only able to perform simple choice and yes/no determination, and are not able to write or input more or complex contents.

SUMMARY OF THE INVENTION

The objective of this invention is to overcome the defect of single function of above existing products and provide a method for processing information in an information processing system, thus enabling either processing handwriting information or click information input through the handwriting input terminal.

The present invention also provides an information processing system, wherein the handwriting input terminal possess function of both handwriting input and click input. The data processing center is able to receive and recognize information inputting through either handwriting input mode or click input mode.

The present invention further provides a handwriting input terminal, which possesses working modes of both handwriting input mode and click input mode.

In one aspect, the present invention relates to a method for processing information in an information processing system, wherein, said information processing system includes a plurality of handwriting input terminals and a data processing center communicatively connected with said plurality of handwriting input terminals via a transceiver; said method comprises following steps:

S1: configuring a handwriting recognition module and a click position coordinate-key mapping module for said information processing system;

S2: receiving information about working mode selection of the information processing system, wherein said working mode comprises a handwriting input mode and a click input mode;

S3: the handwriting input terminal receives and processes handwriting input signals to obtain coordinate information;

S4: selecting the handwriting recognition module or click position coordinate-key mapping module to transform the coordinate information into corresponding character or key information based on the selected working mode.

In one embodiment, said step S1 includes: configuring a handwriting recognition module for said data processing center, and configuring a corresponding click position coordinate-key mapping module for each of said plurality of handwriting input terminals based on the ID code of the handwriting input terminal at the data processing center;

Said step S4 includes:

S41: the handwriting input terminal packs and sends said coordinate information and the ID code of the terminal to the data processing center;

S42: the data processing center processes the received data packages, which including:

in the case of selecting handwriting input mode, the data processing center use the handwriting recognition module to transform said coordinate information to corresponding character; or in the case of selecting click input mode, the data processing center select the corresponding click position coordinate-key mapping module to transform said coordinate information to corresponding key information based on the ID code of the terminal.

Advantagely, in the case of selecting click input mode, said method also comprises the following step:

S5: the data processing center sends said key information back to the handwriting input terminal corresponding to the ID code of said terminal, and then receives the confirm information returned by the handwriting input terminal.

In another embodiment, said step S1 includes: configuring a handwriting recognition module at said data processing system, and configuring a corresponding click position coordinate-key mapping module for each of said plurality of handwriting input terminals at said handwriting input terminals;

Advantagely, said step S4 includes:

in the case of selecting handwriting input mode, the handwriting input terminal packs and sends said coordinate information and the ID code of the terminal to the data processing center, and the data processing center use the handwriting recognition module to transform said coordinate information into corresponding character;

in the case of selecting click input mode, the handwriting input terminal use the configured click position coordinate-key mapping module to transform said coordinate information to corresponding key information, and then packs and to sends the key information and the ID code of the terminal to the data processing center.

In yet another embodiment, said step S1 includes: configuring a corresponding click position coordinate-key mapping module and a handwriting recognition module for each of said plurality of handwriting input terminals;

said S4 includes:

in the case of selecting handwriting input mode, the handwriting input terminal use the handwriting recognition module to transform said coordinate information into corresponding character, and then package and send the character together with the ID code of the terminal to the data processing center;

in the case of selecting click input mode, the handwriting input terminal uses the configured click position coordinate-key mapping module to transform said coordinate information into corresponding key information, and packs and sends the key information together with the ID code of the terminal to the data processing center.

Advantageously, said handwriting input mode comprises free-writing mode, in which, the transforming from the coordinate information to corresponding character by said handwriting recognition module comprises transforming the continuous coordinate information of the handwriting input signals to handwriting character information.

In another aspect, the present invention relates to an information processing system, wherein, the system comprises a plurality of handwriting input terminals, a data processing center communicatively connected with said plurality of handwriting input terminals via a transceiver, wherein for each of said plurality of handwriting input terminals, an unique ID code is allocated; and said information processing system is provided with:

a handwriting recognition module and a click position coordinate-key mapping module;

a device for receiving information about working mode selection of the information processing system, wherein said working mode comprises a handwriting input mode and a click input mode;

a device for enabling the handwriting input terminal to receive and process is handwriting input signals so as to obtain coordinate information;

a device for selecting the handwriting recognition module or click position coordinate-key mapping module based on the selected working mode to transform the coordinate information into corresponding character or key information.

Advantageously, said handwriting recognition module and click position coordinate-key mapping module are both configured at said data processing center.

Advantageously, said handwriting recognition module is configured at said data processing center, and said click position coordinate-key mapping modules are respectively configured at each of said plurality of handwriting input terminals.

Advantageously, said handwriting recognition module and click position coordinate-key mapping module are both configured at said handwriting input terminals.

Advantageously, said device for receiving information about working mode selection of the information processing system is configured at the data processing center and/or one of said plurality of handwriting input terminals.

In yet anther aspect, the present invention relates to a handwriting input terminal, which comprising a writing panel, a sensor module for sensing writing position set on the writing panel, a signal processing unit communicatively connected with said sensor module, and a communication module communicatively connected with said signal processing unit, wherein, said writing panel is divided into a plurality of areas, which including: numeric area, alphabetical area, symbolic area, and control area, said areas are marked with character keys of corresponding type;

said signal processing unit comprises:

a storage module for storing the ID codes of the devices;

a coordinate information generating module for getting and processing the handwriting input signal output by the sensor module to obtain coordinate information of the handwriting positions;

an input mode determining module for determining current working mode of said handwriting input terminal, wherein said working mode comprises a handwriting input mode and a click input mode; and a coordinate information validity determining module for determining whether said coordinate information is valid according to the current working mode.

Advantageously, a display is configured above said handwriting panel; said signal processing unit also comprises a click position coordinate-key mapping module for receiving the output of the coordinate information generating module and transforming the output to key information, and a display driver module communicatively connected with said display.

Advantageously, a display is configured above said handwriting panel, said signal processing unit also a comprises click position coordinate-key mapping module for receiving the output of the coordinate information generating module and transforming the output to key information, a handwriting recognition module for receiving the output of the coordinate information generating module and transforming the output to characters, and a display driver module communicatively connected with said display. Advantageously, said input mode selection key is marked on said writing panel.

In another aspect, the present invention relates to a handwriting input terminal, which including a flat-panel display; a transparent sensing membrane for sensing writing position information, a signal processing unit connected to said sensing membrane, and a display driver module and a communication module communicatively connected with said signal processing module are set on said display, Wherein, said signal processing unit comprises:

a storage module for storing the ID codes of the devices;

a coordinate information generating module for getting and processing the sensing signal output by the sensing membrane to obtain coordinate information of the writing positions;

an input mode determining module for determining current working mode of said handwriting input terminal, wherein said working mode comprises a handwriting input mode and a click input mode; and a coordinate information validity determining module for determining whether said coordinate information is valid according to the current working mode;

wherein, in the case that the current working mode is the click input mode, said signal processing unit outputs control signals to the display driver module to show following functional areas on the display: numeric area, alphabetical area, symbolic area, and control area; said areas are marked with character/symbol keys of corresponding type.

The implementation of the present invention has the following beneficial effects: combination of handwriting panel and voting machine (or answering machine) is able to achieve functions of either handwriting or answering of conveniently sending numbers, letters and symbols of a voting machine.

A plurality of handwriting panels, together with computer, special transceiver, and bundled software construct an answering or writing system can be used by multi-users simultaneously. Handwriting recognition function will be achieved by adding handwriting recognition system into the bundled software.

The information processing system of the present invention is able to achieve complete examination and test functions. It is possible to significantly improve the teachers' work efficiency by employing the present device to implement the electronic test instead of the existing paper testing.

BRIEF DESCRIPTION OF THE DRAWINGS

So as to further explain the invention, an exemplary embodiment of the present invention will be described with reference to the below drawings, wherein.

DETAILED DESCRIPTION OF THE PREFERRED EMBODIMENT

These and other advantage, aspect and novel features of the present invention, as well as details of an illustrated embodiment thereof, will be more fully understand from the following description and drawings. While various embodiments of the present invention has been presented by way of example only, and not limitation.

Figure 1:
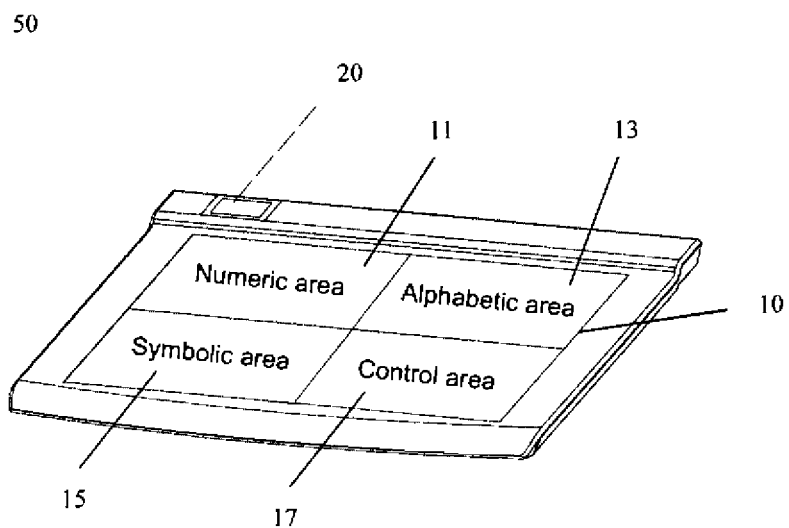
FIG. 1 is a structure diagram of the handwriting input terminal according to the present invention.

FIG. 1 is a structure diagram of the handwriting input terminal 50 according to the present invention. As shown in FIG. 1, the handwriting input terminal 50 comprises a writing panel 10, which is divided into a plurality of areas, such as numeric area 11, alphabetical area 13, symbolic area 15, and control area 17. Each area was marked with corresponding character key (for details, referring to the following description combined with FIGS. 3 and 4). Display area 20 is provided above the writing panel 10. Display area 20 can be built with display component, such as LCD, LED or other display device.

Figure 2:
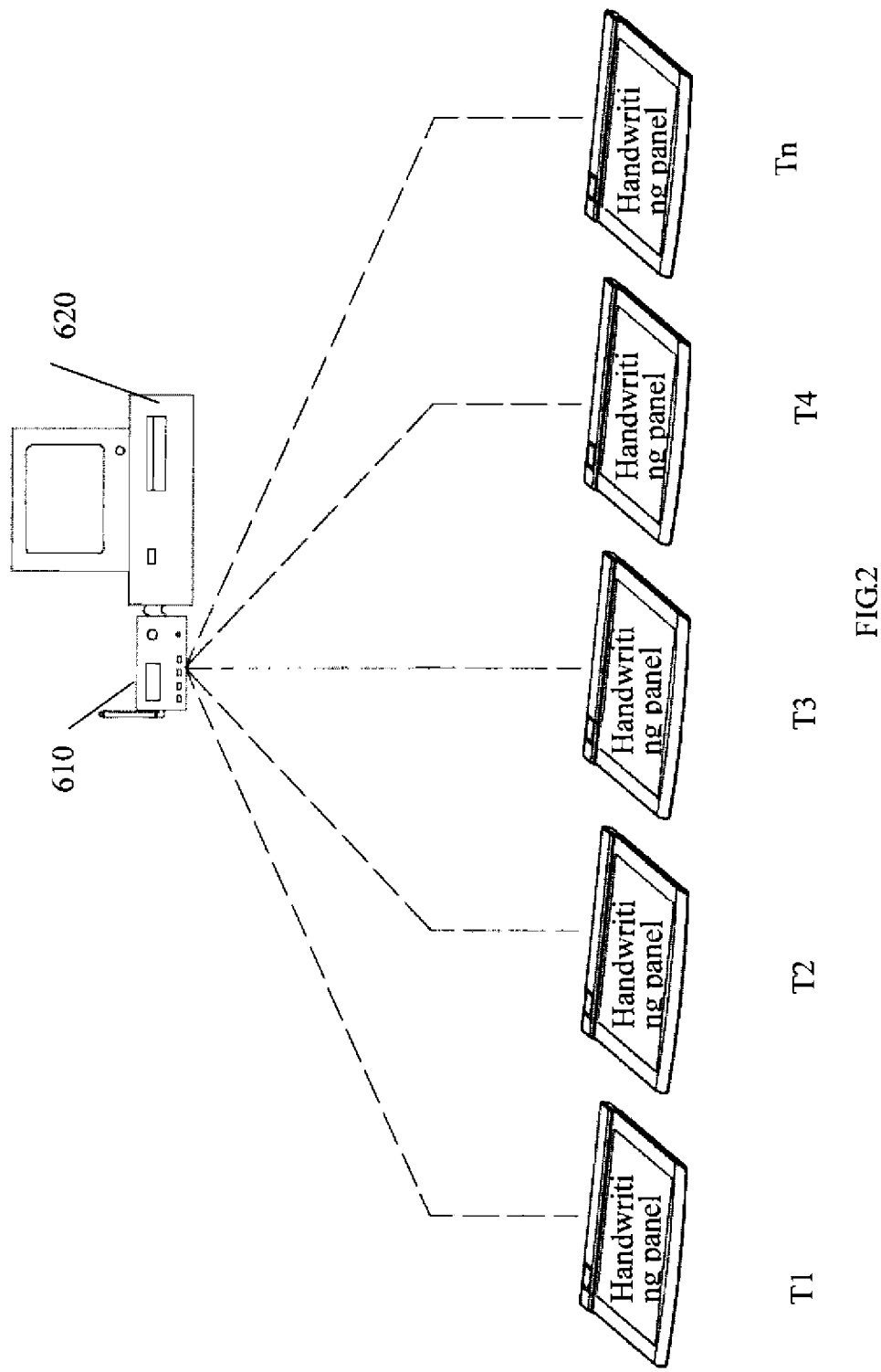
FIG. 2 is a structure diagram of the information processing system according to the present invention.

FIG. 2 is a structure diagram of the information processing system according to the present invention. As shown in FIG. 2, the information processing system comprises a plurality of handwriting input terminals T1-Tn, a transceiver 610 and a data processing center 620, wherein the plurality of handwriting input terminals T1-Tn are communicatively connected with the data processing center 620 through the transceiver 610. The communication connection can be wired connection (such as using USB, RS232 or other cable), or wireless connection (such as using RF, infrared, Bluetooth or other wireless transceiver).

Based on the corresponding relationship of coordinate position on the handwriting board, the present invention defines a series of specific areas on the handwriting board to establish one-to-one correspondence between such areas and control signals (including numbers, letters, all kinds of symbols, and some specific computer commands, etc.). When the user clicks the specific areas on the handwriting board, then the corresponding position information will be transmitted from the handwriting board to the connected computer. The position information will be identified as corresponding information, such as numbers, letters, all kinds of symbols, and some specific computer commands and so on by the bundled computer software, so as to implement functions of answering, voting, performing corresponding operations of the computer and so on.

Figure 3:
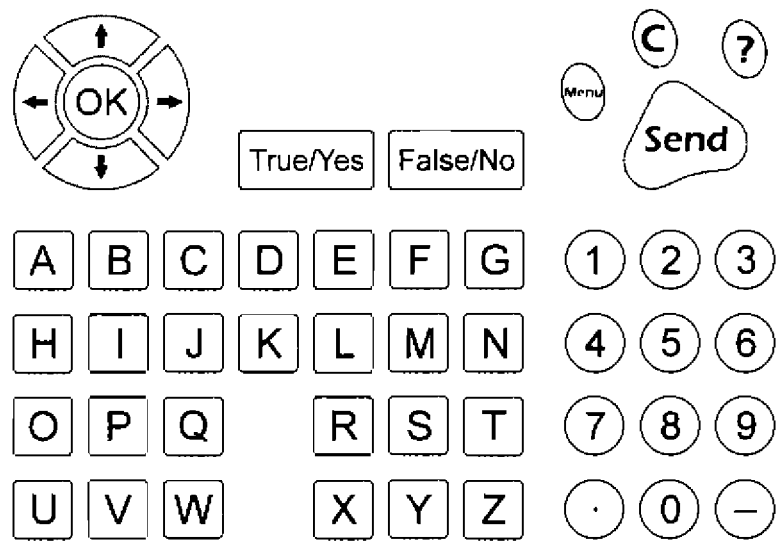
FIG. 3 is a key layout of the writing panel of the handwriting input terminal according to an embodiment of the present invention.

FIG. 3 is a key layout of the writing panel of the handwriting input terminal according to an embodiment of the present invention. As shown in FIG. 3, the alphabetical area includes 26 alphabetical key icons, the numeric area includes numeric key icons of 0-9, and key icons of symbols ".", and "-", the symbolic area includes key icons of symbols "Menu", "C", "Send", "?", "True/Yes", and "False/No", and the control area includes the key icons of up, down, left, right and enter (OK). These key icons can be printed on the handwriting board, or paste films printed with these key icons attached to the writing panel.

Figure 4:
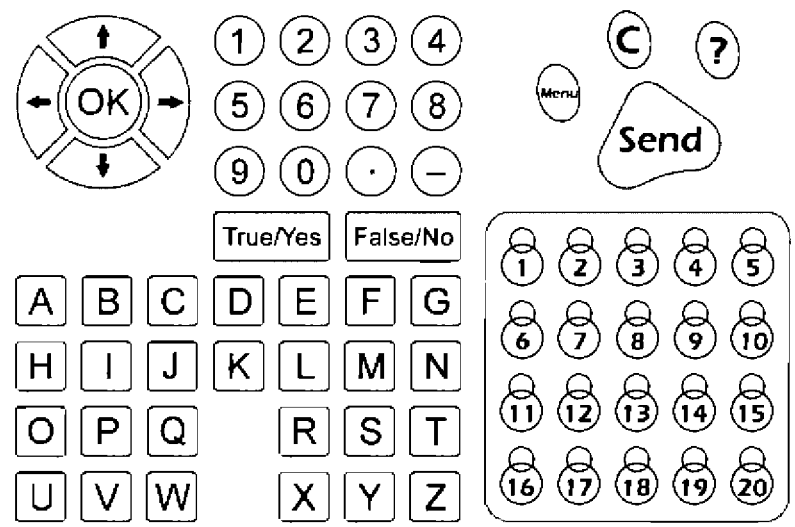
FIG. 4 is a key layout of the writing panel of the handwriting input terminal according to a further embodiment of the present invention.

FIG. 4 is a key layout of the writing panel of the handwriting input terminal according to a further embodiment of the present invention. Besides the location of the numeric area being difkrent from the FIG. 3, the embodiment shown in FIG. 4 further comprises a number-selecting area, which including key icons of 1#-20#, and can be used to send question answering invitation signals. For example, there is a system connected with 21 handwriting input terminals, wherein one terminal is teacher (or host) end using the key layout shown in FIG. 4, while the other 20 terminals are student (guest) ends using key layout shown in the FIG. 3. The teacher can click any one key of 1#-20# to invite the selected student end to answer questions. Information of the selected student end will be sent to the data processing center, and then be retransmitted to the handwriting input terminal of student end by the data processing center. The handwriting input terminal is able to notify the students using the terminal to answer the question by configuring a sound or light reminder.

Figure 5A:
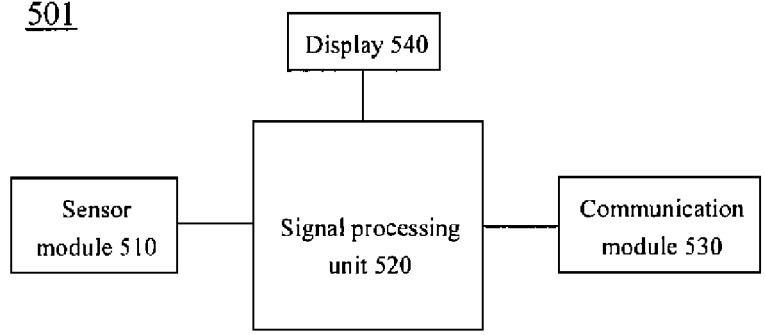
FIG. 5A is a module block diagram of the handwriting input terminal according to the present invention.

FIG. 5A is a module block diagram of the handwriting input terminal 501 according to the present invention. As shown in FIG. 5A, the handwriting input terminal 501 comprises a sensor module 510 used for sensing the writing position, a signal processing unit 520 communicatively connected with the sensor module, and a communication module 530 communicative connected with the signal processing unit. A display 540 is also provided and connected to the signal processing unit 520.

Figure 5B:
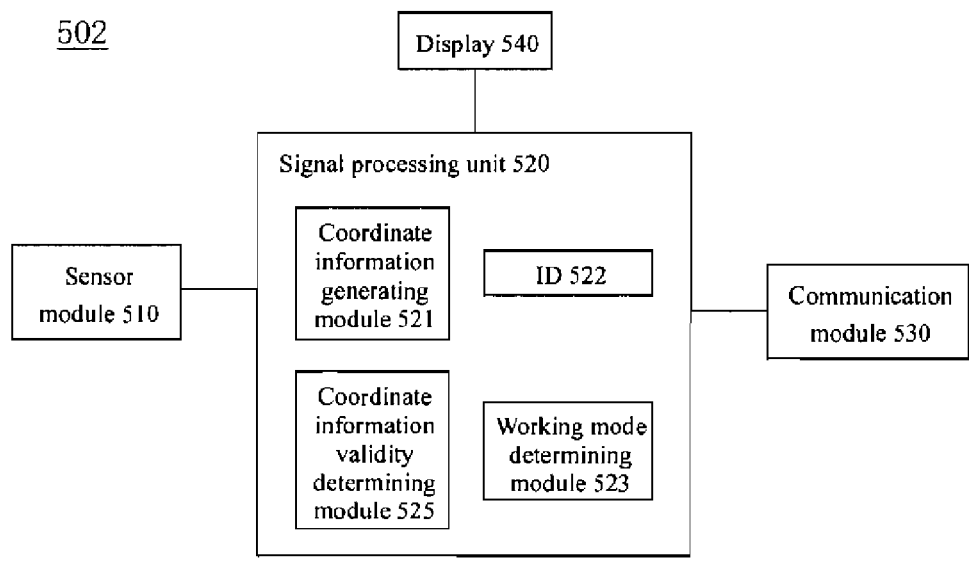
FIG. 5B is a module block diagram of the handwriting input terminal according to the first embodiment of the present invention.

FIG. 5B is a module block diagram of the handwriting input terminal 502 according to the first embodiment of the present invention. As shown in FIG. 5B, the signal processing unit 520 comprises an ID code storage module 522 of the handwriting input terminal, a coordinate information generating module 521, a working mode determining module 523 and a coordinate information validity determining module 525. Wherein the ID code of the handwriting input terminal is unique, thus different from other handwriting input terminals.

Figure 5C:
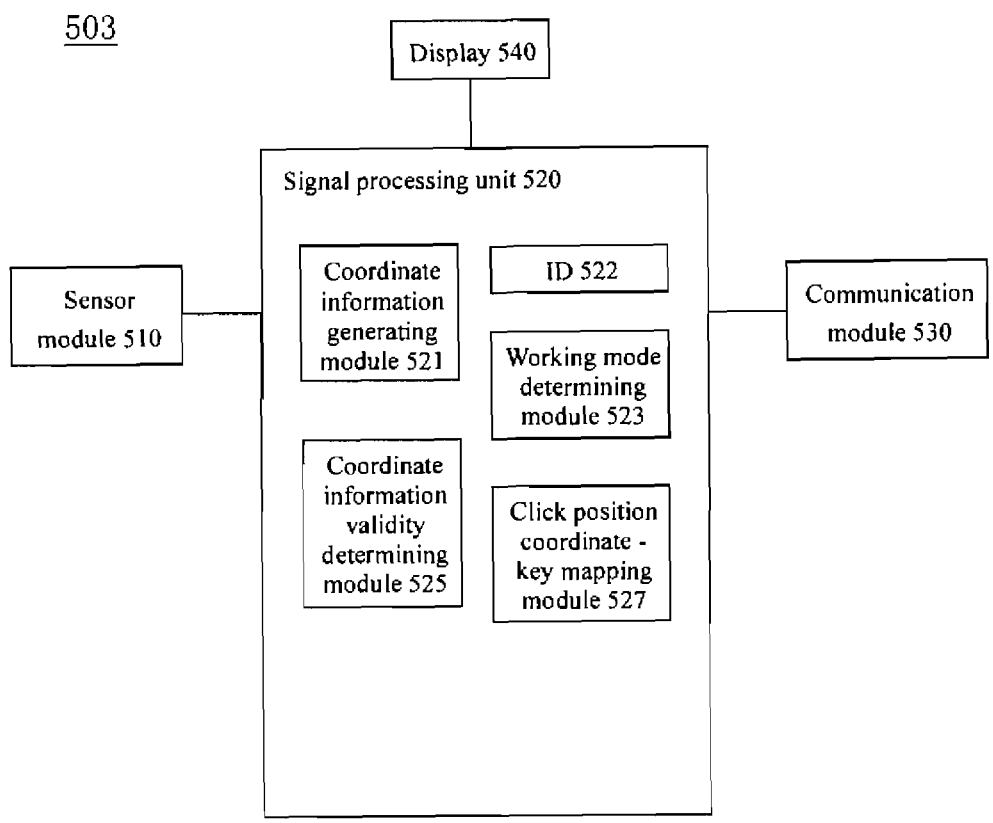
FIG. 5C is a module block diagram of the handwriting input terminal according to the second embodiment of the present invention.

In the operation process, the handwriting input terminal 502 receives working mode selection information through the communication module 530, and stores the current working mode. For example, in the embodiment of the present invention, the working mode comprises a handwriting input mode and a click input mode, while the click input mode further comprises a voting mode and an answering mode. The coordinate information generating module 521 receives and processes the handwriting input signal output by the sensor module to obtain coordinate information of the writing pen. The working mode determining module 523 determines the current working mode of the handwriting input terminal, the coordinate information validity determining module 525 determines the validity of the coordinate information according to the result of the working mode determination and/or according to the valid range pre-saved in MCU. If coordinate information obtained in the handwriting input mode is a single click position, the coordinate information can be determined to be invalid and the user will be notified via the display. Whereas, if continuous position change is obtained in the click input mode, the obtained coordinate information will also be invalid. Moreover, the coordinate will be determined to be valid when it is in valid coordinate value range, and will be determined to be invalid when it exceeds the valid coordinate value range. In further embodiments of the present invention, indicator light or sound-producing device may be set on the handwriting input terminal to give user a cue signal. In the case of the coordinate information being valid, the handwriting input terminal will pack and then send out its terminal ID code and the coordinate information via the communication module 530, FIG. 5C is a module block diagram of the handwriting input terminal 503 according to the second embodiment of the present invention. Comparing with the handwriting input terminal 502 shown in FIG. 5B, the handwriting input terminal 503 according to FIG. 5C further comprises a click position coordinate-key mapping module 527. In the present embodiment, in the case of operating in the click input mode, the click position coordinate-key mapping module 527 will transform coordinate information into corresponding key information, and the handwriting input terminal will pack and send out its terminal ID code and the key information via the communication module 530. While in the case of operating in the handwriting input mode, the handwriting input terminal will pack and then send out its ID code and the coordinate information via the communication module 530.

Figure 5D:
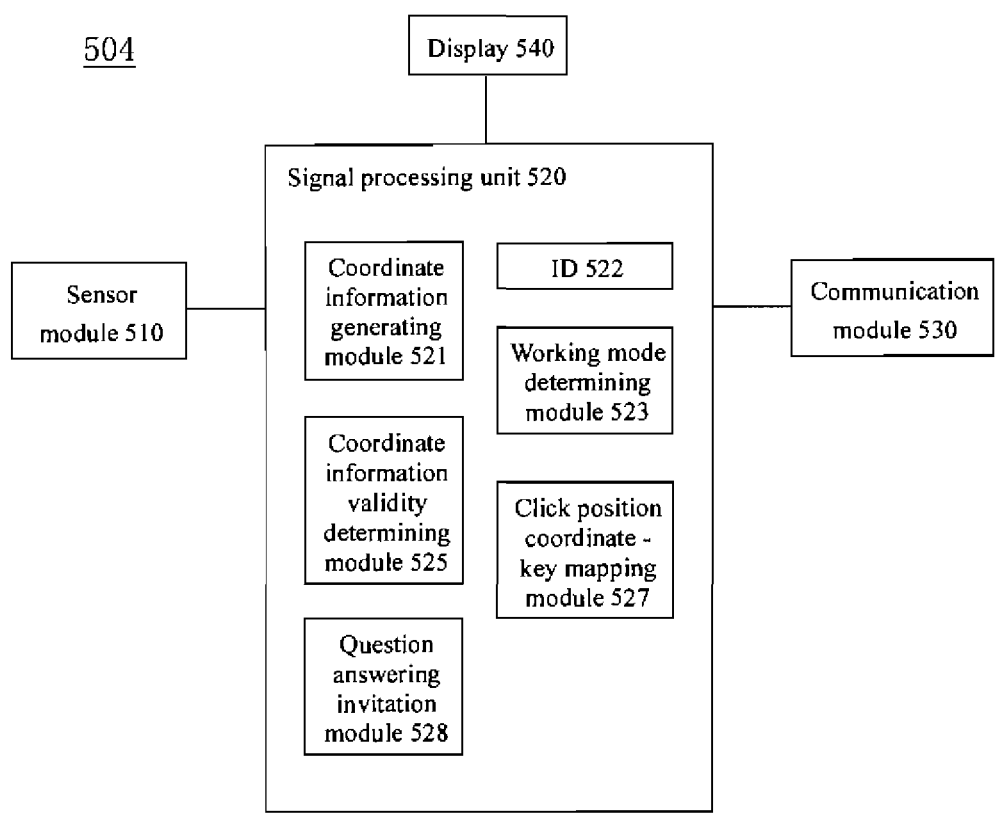
FIG. 5D is a module block diagram of the handwriting input terminal according to the third embodiment of the present invention.

FIG. 5D is a module block diagram of the handwriting input terminal 504 according to the third embodiment of the present invention. Comparing with the handwriting input terminal 503 shown in FIG. 5C, the signal processing unit 520 of the handwriting input terminal 504 according to FIG. 5D further comprises working mode selecting module 524 and removes the working mode determining module 523. The handwriting input terminal 504 of the present embodiment corresponds with the handwriting input terminal of teacher (or host) end according to FIG. 4. In the information processing system of the present invention, working mode can be selected via the handwriting input terminal of teacher end according to the present embodiment. Information of the selected working mode can be sent to the data processing center through the communication module 530, and then be retransmitted to student (guest) ends.

Figure 5E:
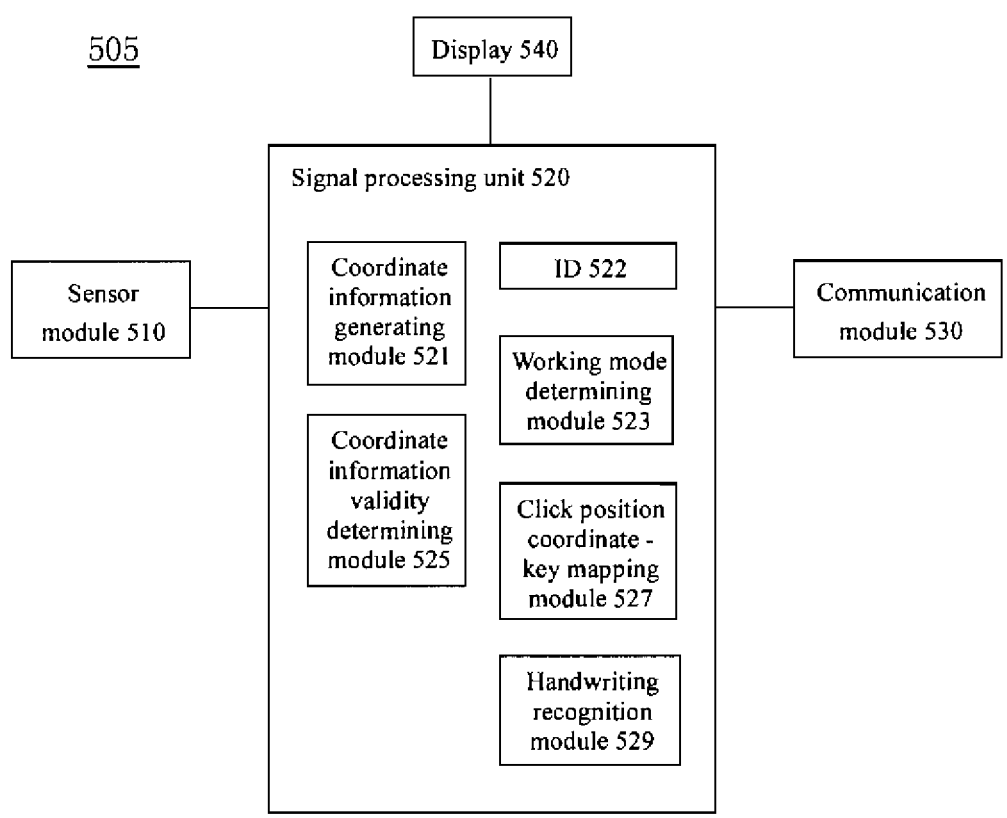
FIG. 5E is a module block diagram of the handwriting input terminal according to the forth embodiment of the present invention.

FIG. 5E is a module block diagram of the handwriting input terminal 505 according to the forth embodiment of the present invention. Comparing with the handwriting input terminal 503 shown in FIG. 5C, a handwriting recognition module 529 is added into the handwriting input terminal 505 according to FIG. 5E. In the present embodiment, in the case of operating in the click input mode, the click position coordinate-key mapping module 527 will transform coordinate information into corresponding key information, and the handwriting input terminal will pack and send out its terminal ID code and the key information via the communication module 530. While in the case of operating in the handwriting input mode, the handwriting recognition module 529 will transform coordinate information into corresponding character information, and the handwriting input terminal will pack and then send out its terminal ID code and the character information via the communication module 530.

Based on above embodiments, wherein, the display and the sensor module can be further transformed. For example, the writing panel and the small display set above can be integrated into a whole flat-panel display, on which transparent sensor membrane used as a sensor module for sensing writing position information is pasted. In the case that the current working mode is click input mode, the signal processing unit of the handwriting input terminal outputs control signal to the display driver module so as to show following function areas on the display: numeric area, alphabetical area, symbolic area and control area, each said area is marked with character/symbol key of corresponding types.

Figure 6A:
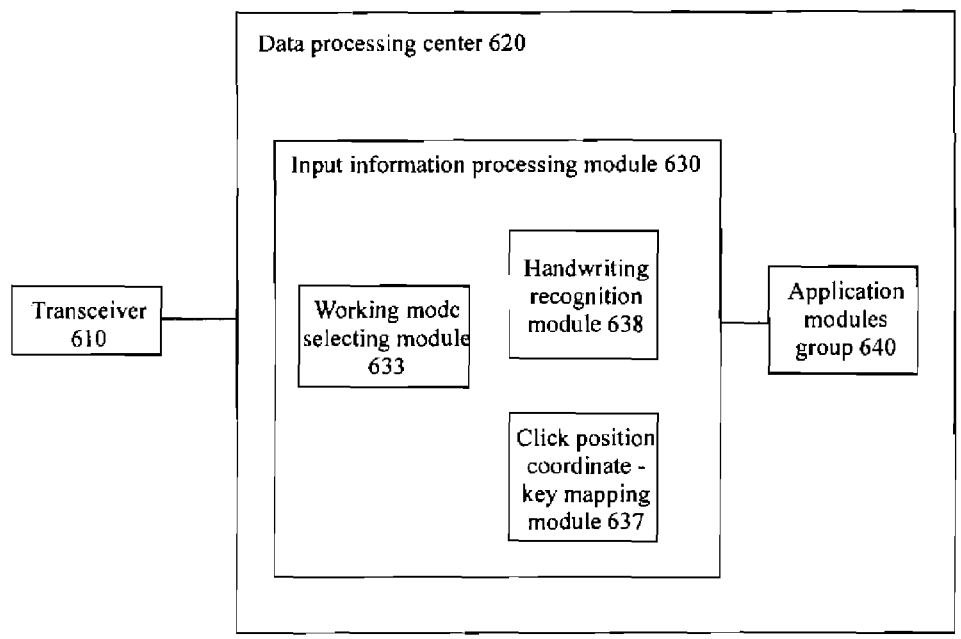
FIG. 6A is a module block diagram of the data processing center in the information processing system according to the first embodiment of the present invention.

FIG. 6A is a module block diagram of the data processing center 620 in the information processing system according to the first embodiment of the present invention. As shown in FIG. 6A, the data processing center 620 comprises an input information processing module 630 and application modules group 640. Wherein, the input information processing module 630 comprises a working mode selecting module 633, a handwriting recognition module 638, and a click position coordinate-key mapping module 637. In the present embodiment, the data processing center 620 is able to receive coordinate information sent by the handwriting input terminal, and use the handwriting recognition module 638 or the click position coordinate-key mapping module 637 to process the coordinate information so as to transform it into corresponding character or key according to the current working mode of the system. In the present embodiment, the click position coordinate-key mapping module 637 comprises click position coordinate-key mapping modules (or mapping table) corresponding with each handwriting input terminal. Usually, one kind of key layout corresponds with one kind of click position coordinate-key mapping module. If handwriting input terminal of teacher end and handwriting input terminal of student end are both used in the system, there must be at least two kinds of click position coordinate-key mapping modules.

In the operation process, in the case that the system operate in the handwriting input mode, the data processing center 620 use the handwriting recognition module 638 to transform coordinate information into corresponding character information. In the case that the system operate in the click input mode, the data processing center 620 uses the corresponding click position coordinate-key mapping module selected based on the ID code of the terminal to transform coordinate information into corresponding key information. The transformed information will be transmitted to the applications within the application modules group 640 for subsequent processing. For example, these applications comprise word processing program, examination program, question answering competition program, voting program etc.

Figure 6B:
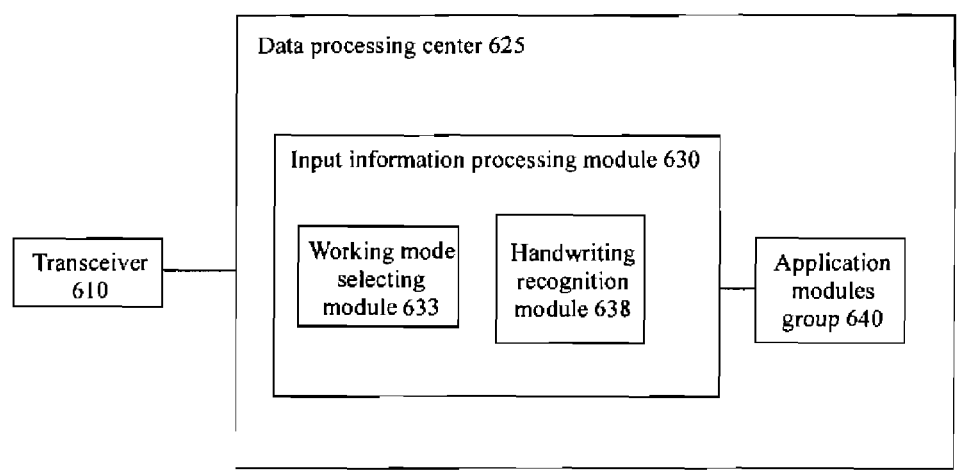
FIG. 6B is a module block diagram of the data processing center in the information processing system according to the second embodiment of the present invention.

FIG. 6B is a module block diagram of the data processing center 625 in the information processing system according to the second embodiment of the present invention. As shown in FIG. 6B, the data processing center 625 comprises an input information processing module 630 and application modules group 640. Wherein, the input information processing module 630 comprises a working mode selecting module 633 and a handwriting recognition module 638.

In the operation process of the present embodiment, in the case that the system operates in the handwriting input mode, the data processing center 625 uses the handwriting recognition module 638 to transform said coordinate information into corresponding character information. Then character information will be transmitted to the applications within the application modules group 640 for subsequent processing. In the case that the system operating in the click input mode, coordinate information will be transformed into corresponding key information and then be sent to the data processing center 625 by each handwriting input terminal. Subsequently, the data processing center 625 will transmit the key information again to the applications within the application modules group 640 for subsequent processing.

Figure 6C:
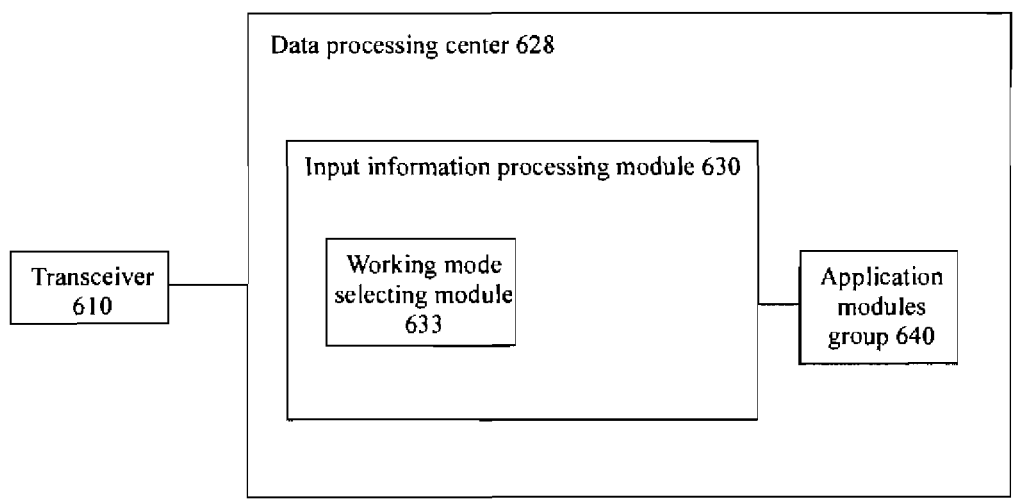
FIG. 6C is a module block diagram of the data processing center in the information processing system according to the third embodiment of the present invention.

FIG. 6C is a module block diagram of the data processing center 628 in the information processing system according to the third embodiment of the present invention. As shown in FIG. 6C, the data processing center 628 comprises an input information processing module 630 and application modules group 640. Wherein, the input information processing module 630 comprises a working mode selecting module 633.

In the operation process of the present embodiment, in the case that the system operating in the handwriting input mode, each handwriting input terminal may transform the coordinate information into corresponding character information and then sent to the data processing center 628. Subsequently, the data processing center 628 will transmit character information again to applications within the application modules group 640 for subsequent processing. In the case that the system operating in the click input mode, each handwriting input terminal will transform the coordinate information into corresponding key information and then to sent such corresponding key information to the data processing center 628. Subsequently, the data processing center 628 will transmit the key information to the applications within the application modules group 640 for subsequent processing.

For simplification, FIGS. 6A-6C only show a part of the components in the data processing center, it shall be understood for one skilled in the art that the data processing center also comprises other modules, such as memory, central processing unit and/or display etc.

Furthermore, it should be noted that the handwriting input mode comprises free-writing mode in some embodiments according to the present invention. In this case, the handwriting recognition module is able to completely transform continuous or interrupted coordinate information of the handwriting input signal into characters and/or graphs of handwritten form. The effect of "what you see is what you write" can be obtained if these characters and/or graphs are shown on the display. Moreover, these characters and/or graphs can be saved in the memory, and read from the memory and shown on the display when it is needed.

Figure 7:
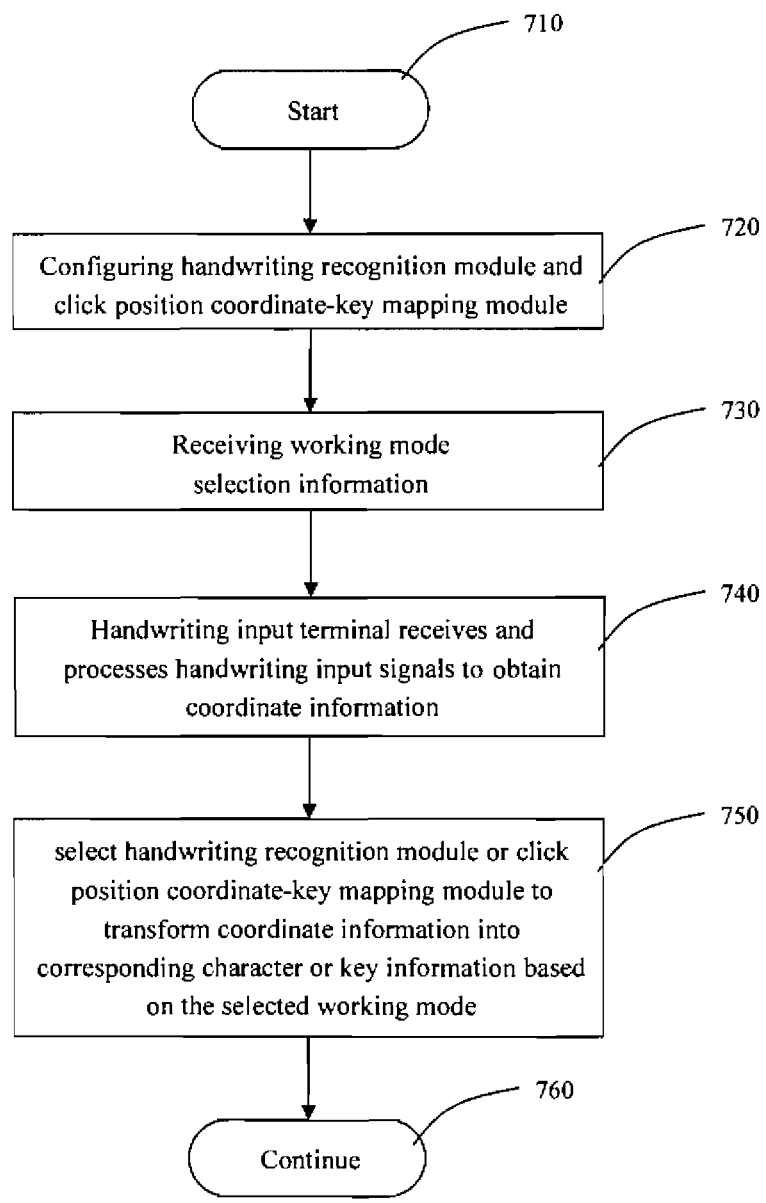
FIG. 7 is a process flow diagram of the information processing method according to the present invention.

FIG. 7 is a process flow diagram of the information processing method 700 performed in the information processing center according to the present invention. According to FIG. 7, the method 700 begins with the step 710. In the step 720, configure said information processing system with a handwriting recognition module and a click position coordinate-key mapping module, wherein include configuring each of the handwriting input terminal with a corresponding click position coordinate-key mapping module. As mentioned earlier, the click position coordinate-key mapping module can be configured at the handwriting input mode or the data processing center. In the step 730, receives information about working mode selection for the information processing system, wherein, said working mode comprises a handwriting input mode and a click input mode. In the step 740, the handwriting input terminal receives and processes handwriting input signals to obtain coordinate information. In the step 750, select handwriting recognition module or click position coordinate-key mapping module to transform coordinate information into corresponding character or key information based on the selected working mode. b In the step 760, subsequent processing is performed.

Figure 8A:
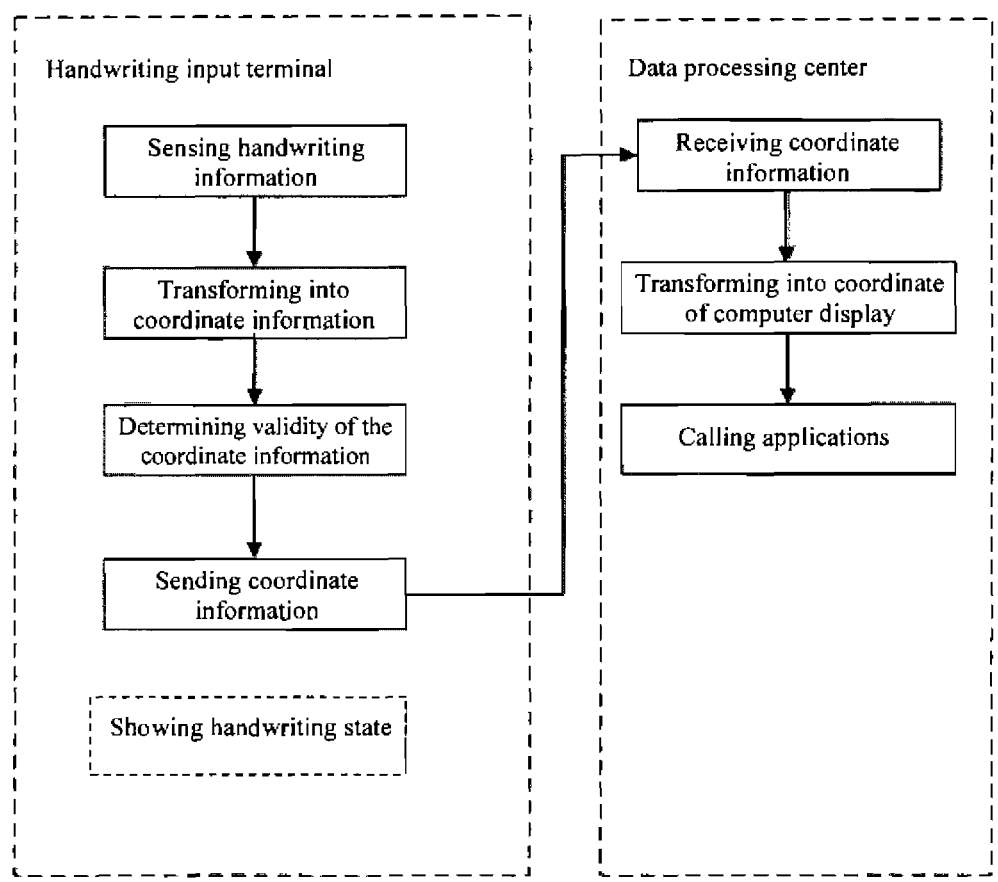
FIG. 8A is a flow diagram of the operating procedures of the information processing system in the writing input mode according to embodiment of the present invention.

FIG. 8A is a flow diagram of the operating procedures of the information processing system in the writing input mode according to embodiment of the present invention. As shown in FIG. 8A, for the present embodiment, in the handwriting input terminal, handwriting information will be sensed and then transformed into coordinate information, and then the validity of the coordinate information will be determined according to the current working mode. In the case that the coordinate information is valid, the coordinate information will be sent to the data processing center. In the data processing center, the coordinate information will be received and transformed into coordinate of the computer display, and then applications will be called to process such coordinate. For example, the applications may comprise: drawing program (for achieving functions of drawing, writing and editing), eraser (for achieving function of erasing), file management program (for achieving file creation and saving), resource management program (for achieving management of multimedia resources and teaching resources) etc.

Figure 8B:
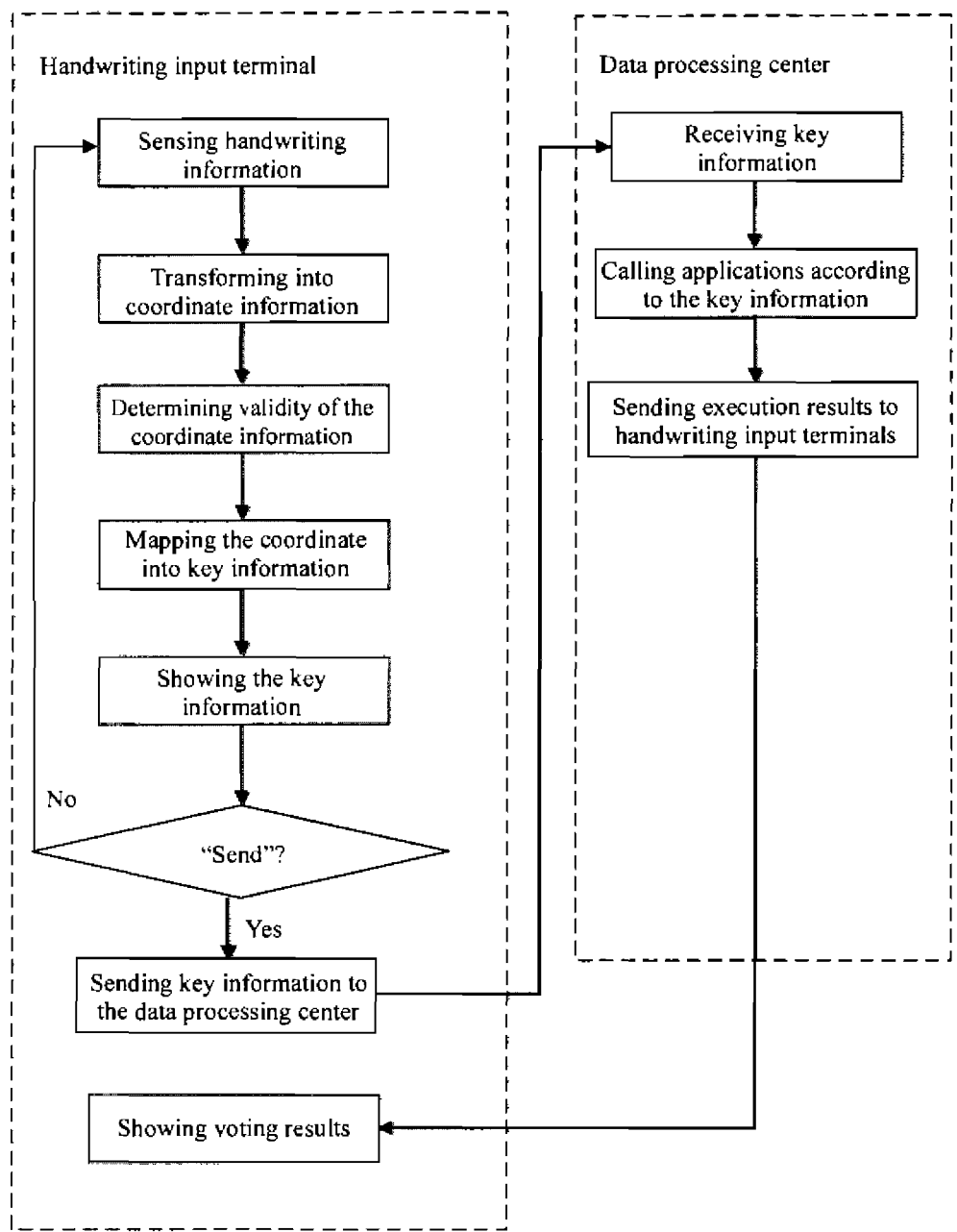
FIG. 8B is a flow diagram of the voting operation in the click input mode of the information processing system according to the first embodiment of the present invention.

FIG. 8B is a flow diagram of voting operation under the click input mode performed by the information processing system according to the first embodiment of the present invention. As shown in FIG. 8B, for the present embodiment, in the handwriting input terminal, the handwriting information will be sensed and transformed into coordinate information, and then the validity of the coordinate information will be determined according to the current working mode. In the case that the coordinate information is valid, the coordinate information will be mapped into key information and such key information will be shown. Then, determine that whether the "send" key has been press, if yes, the key information will be sent to the data processing center, or else the next processing will be carried out. In the data processing center, the key information will be received and applications will be called according to the key information, then execution results of the applications will be sent to the handwriting input terminal. The handwriting input terminal will show the voting results.

Figure 8C:
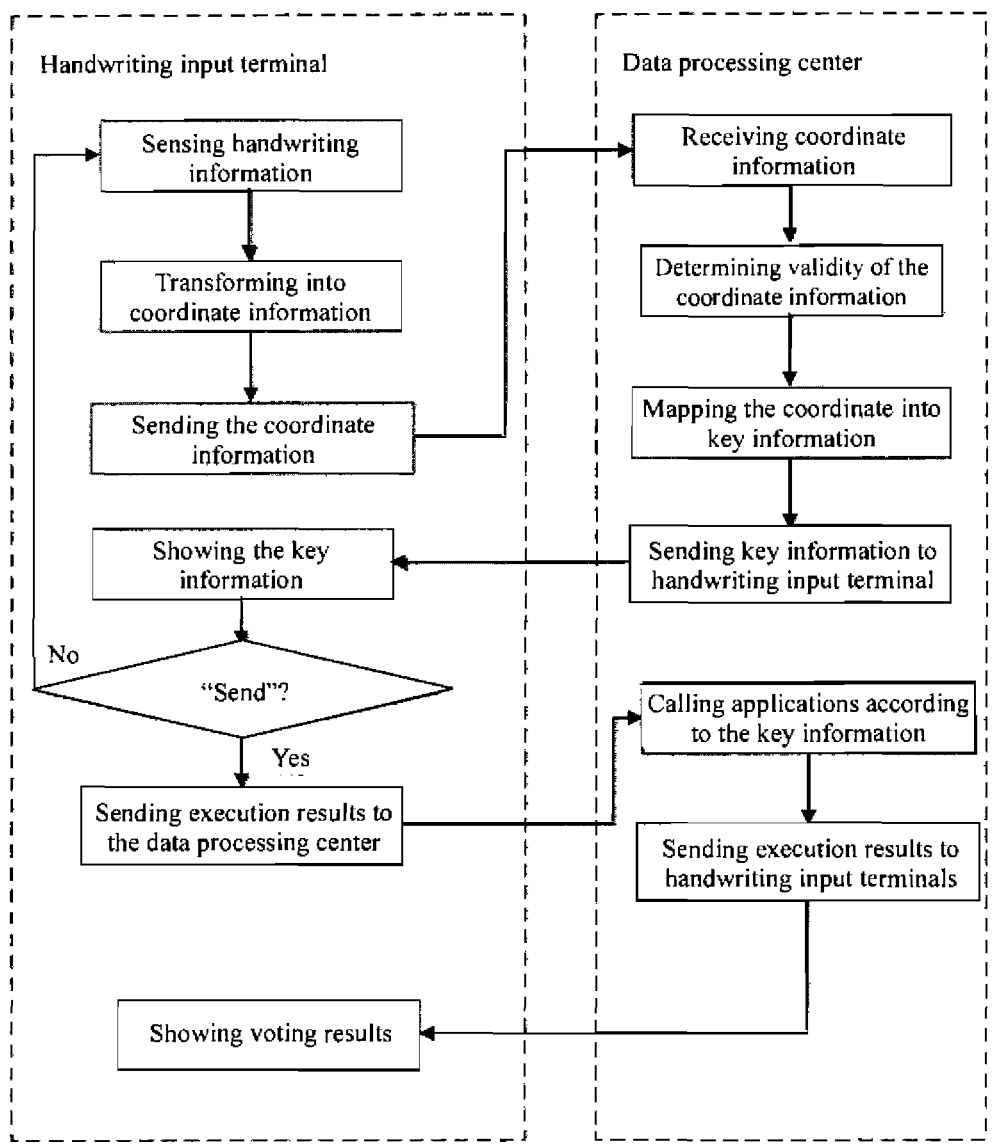
FIG. 8C is a flow diagram of the voting operation in the click input mode of the information processing system according to the second embodiment of the present invention.

FIG. 8C is a flow diagram of the voting operation in the click input mode performed by the information processing system according to the second embodiment of the present invention. As shown in FIG. 8C, for the present embodiment, in the handwriting input terminal, handwriting information will be sensed and transformed into coordinate information, and then such coordinate information will be sent to the data processing center. In the data processing center, the coordinate information will be received and then the validity of the coordinate information will be determined. In the case that the coordinate information is valid, the coordinate information will be mapped into key information and such key information will be sent to the handwriting input terminal. The handwriting input terminal will show the key information and then determine whether the "send" key has been pressed, if yes, the execution command will be sent to the data processing center, or else the next processing will be carried out. The data processing center will call applications according to the key information, and then send the execution results to the handwriting input terminal. The handwriting input terminal will show the voting results.

Figure 8D:
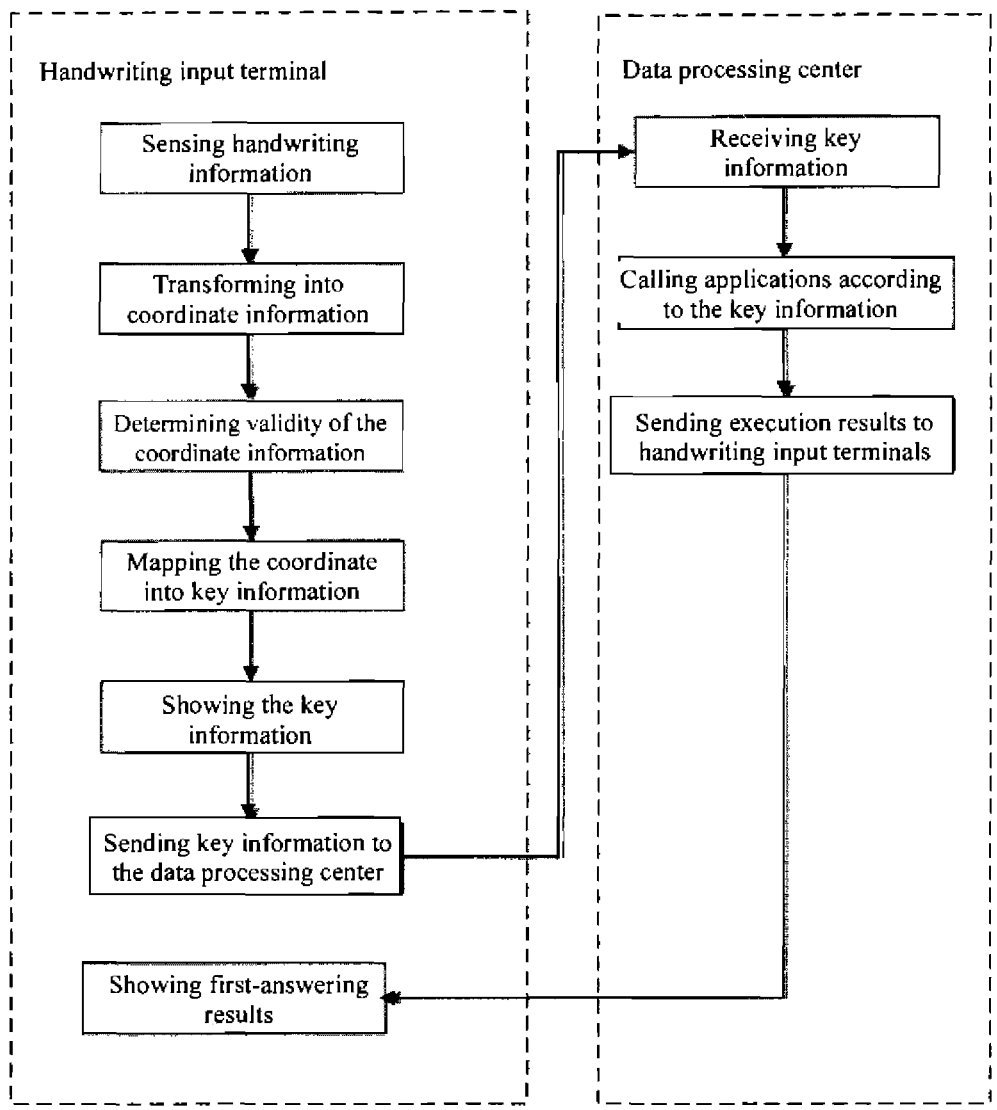
FIG. 8D is a flow diagram of the first-answering operation in the click input mode of the information processing system according to the embodiment of the present invention.

FIG. 8D is a flow diagram of first-answering operation in the click input mode performed by the information processing system according to the embodiment of the present invention. As shown in FIG. 8D, for the present embodiment, in the handwriting input terminal, handwriting information will be sensed and transformed into coordinate information, and then the validity of the coordinate information will be determined according to the current working mode. In the case that the coordinate information is valid, the coordinate information will be mapped into key information, and then such key information will be shown. Subsequently, the key information will be sent to the data processing center. In the data processing center, the key information will be received and applications will be called according to the key information, then execution results of the applications will be sent to the handwriting input terminal. The handwriting input terminal will show the first-answering results.

Figure 9:
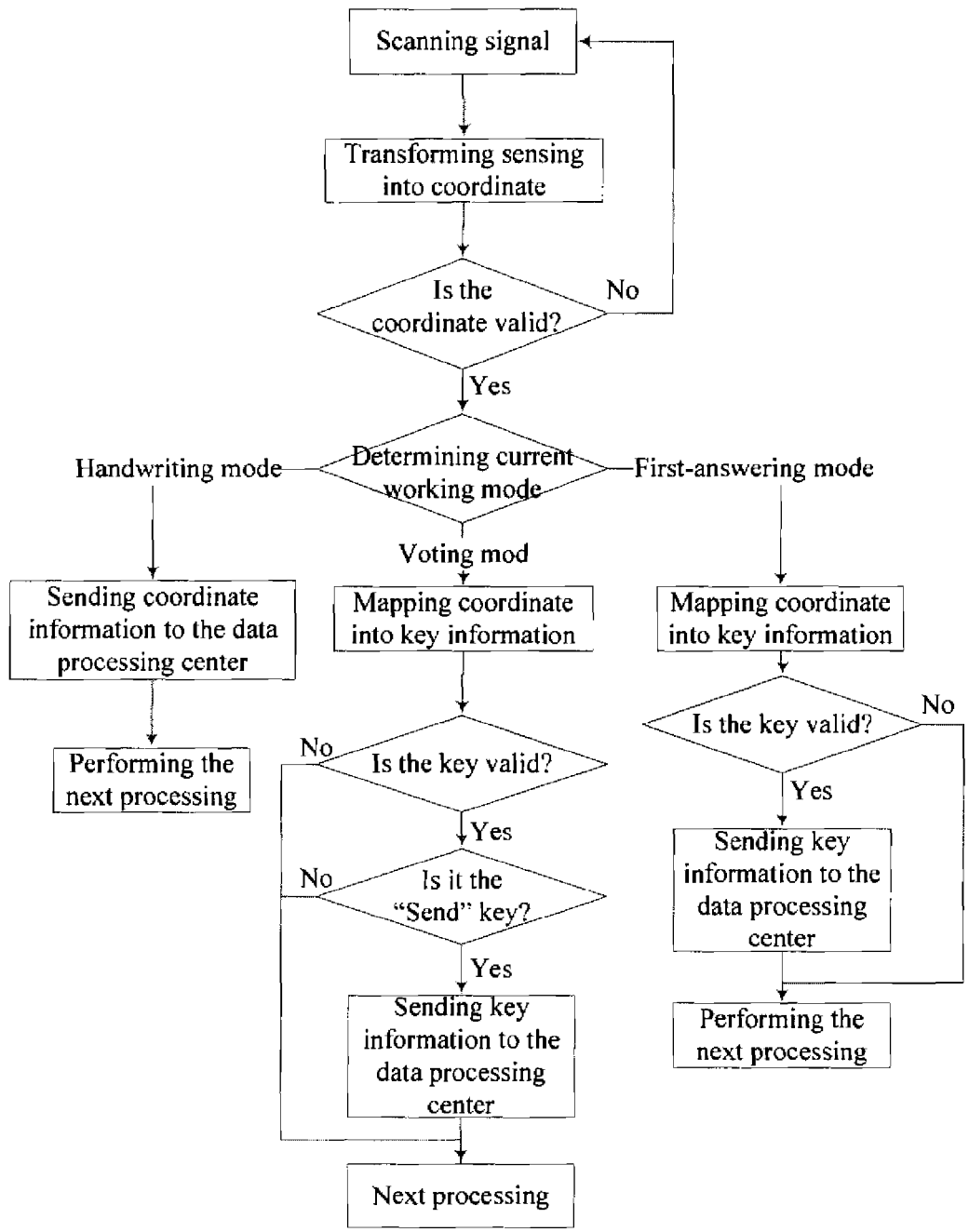
FIG. 9 is a flow diagram of the operating procedures of MCU in the handwriting input terminal according to embodiment of the present invention.

FIG. 9 is a flow diagram of the operating procedures of MCU in the handwriting input terminal according to embodiment of the present invention. In the present embodiment, the click position coordinate-key mapping module is configured in the handwriting input terminal. As shown in FIG. 9, in one processing procedure, the MCU scans handwriting input signal at first, then transforms the handwriting input signal into coordinate information and determines whether the coordinate information is valid. For example, a valid value range is pre-saved in the MCU, such coordinate will be determined to be valid when it is in valid coordinate value range, be invalid when it is outside such range. Subsequently, the current working mode will be determined.

In the case that the current working mode is the handwriting mode, the coordinate information will be sent to the data processing center for next processing.

In the case that the current working mode is voting mode, the coordinate will be mapped into key information. Determine that whether the key is valid, if yes, further determine that whether the key is the "send" key, if yes, the key information will be sent to the data processing center, or else the next processing will be carried out.

In the case that the current working mode is first-answering mode, the coordinate will be mapped into key information. Determine that whether the key is valid, if yes, the key information will be sent to the data processing center, or else the next processing will be carried out.

It should be noted that, in the operating procedures shown in FIG. 9, the current working mode can be determined before the validity determination of the coordinate. About this point, the working process of the handwriting input terminal 502 according to the first embodiment of the present invention described above combined with FIG. 5B may be taken as reference.

The present invention relates to computer information processing, and more specifically, to a computer handwriting panel input and signal control system, which defines a series of specific areas on the handwriting panel by using the corresponding relation of coordinate position on the handwriting panel to make one-to-one correspondence between these areas and control signals (including numbers, letters, various symbols, and some specific computer management commands, etc). When user clicks the specific areas of the handwriting panel, the handwriting panel will send corresponding position information to the connected computer, the position information will be recognized as information of corresponding number, letter, symbol, and some specific computer management commands, etc by bundled computer software, in such a way, functions of answering, voting, executing computer-related operation, etc will therefore be achieved. Meanwhile, a transceiver which is able to simultaneously connect with several answer-typed handwriting panels in a wired or wireless manner is configured at the computer together with special software, in such a way, a system is constructed. Such transceiver is able to, receive signals sent from all connected handwriting panels simultaneously, thus achieve simultaneously answering of multi-users.

The present invention integrates two functions of handwriting input and click input to solve problems existed in handwriting panel and voting machine according to the prior art. Meanwhile, writing and voting operation can be performed simultaneously by multi-users through utilizing the present invention.

1. This handwriting panel possesses the handwriting input function of conventional handwriting panels, that is, the handwriting panel is able to detect user's handwriting coordinate information on the handwriting panel, and send corresponding coordinate information to the connected computer;

2. This handwriting panel defines a series of specific areas on the panel to make one-to-one correspondence between these areas and control signals (including numbers, letters, various symbols, and some specific computer is management commands, etc);

3. When user clicks above areas of the handwriting panel, the handwriting panel will send corresponding coordinate information to the connected computer;

4. The computer uses special applications to process the coordinate information sent from the handwriting panel, transform the coordinate information into corresponding control signal (including numbers, letters, various symbols, and some specific computer management commands, etc) defined on the handwriting panel;

5. Display component, such as LCD, LED, etc, may be set on the handwriting panel for ensuring accuracy of the voting information, information to be sent may be shown on the LCD;

6. The connection between the handwriting and the computer may be wired connection, such as connected by connecting line, such as USB, RS 232 bus, or may be wireless connection;

7. A transceiver which is able to simultaneously connect with several answer-typed handwriting panels in a wired or wireless manner is configured at the computer together with special software;

8. The transceiver is able to receive signals sent from all connected handwriting panels, and recognize the coding (or ID code) of the handwriting panel, as well as the time sequence of receiving signals simultaneously, thus achieving the function of simultaneously answering of multi-users.

The functional combination of voting machine (or answering machine) and handwriting panel as well as the complete answering and examination function is achieved by utilizing function of defining various letters, numbers, and symbols on the handwriting panel.

A transceiver which is able to simultaneously connect with several answer-typed handwriting panels in a wired or wireless manner is configured at the computer together with special software, in such a way, a system is constructed, Moreover, such transceiver is able to, receive signals sent from all connected handwriting panels simultaneously, thus achieve simultaneously answering of multi-users.

The foregoing description is just the preferred embodiment of the invention. It is not intended to exhaustive or to limit the invention. Any modifications, variations, and amelioration without departing from the spirit and scope of the present invention should be included in the scope of the prevent invention.

The invention claimed is:

1. A method for processing information in an information processing system, wherein the information processing system comprises a plurality of handwriting input terminals, and a data processing center which is communicatively connected with said plurality of handwriting input terminals via a transceiver; wherein, said method includes following steps:
    S1: configuring handwriting recognition module and click position coordinate-key mapping module for said information processing system;
    S2: receiving information about working mode selection of the information processing system, wherein said working mode comprises a handwriting input mode and a click input mode;
    S3: the handwriting input terminal receives and processes handwriting input signals to obtain coordinate information;
    S4: selecting the handwriting recognition module or click position coordinate-key mapping module to transform the coordinate information into corresponding character or key information based on the selected working mode;
    wherein, said step S1 includes:
    configuring a handwriting recognition module for said data processing center, and configuring a corresponding click position coordinate-key mapping module for each of said plurality of handwriting input terminals according to an ID code of the handwriting input terminal at the data processing center;
    said step S4 includes:
    S41: the handwriting input terminal packs and sends said coordinate information and the ID code of the terminal to the data processing center;
    S42: the data processing center processes the received data packages, which including:
    in the case of selecting handwriting input mode, the data processing center use the handwriting recognition module to transform said coordinate information to corresponding character; or
    in the case of selecting click input mode, the data processing center select the corresponding click position coordinate-key mapping module to transform said coordinate information to corresponding key information according to the ID code of the terminal.

2. The method for processing information in an information processing system according to claim 1, wherein, in the case of selecting click input mode, said method also comprises the following step:
    S5: the data processing center sends said key information back to the handwriting input terminal corresponding to the ID code of said terminal, and then receives the confirm information returned by the handwriting input terminal.

3. The method for processing information in an information processing system according to claim 1, wherein, said handwriting input mode comprises free-writing mode, in which, the transforming from the coordinate information to corresponding character by said handwriting recognition module comprises transforming the continuous coordinate information of the handwriting input signals to handwriting character information.

4. A method for processing information in an information processing system, wherein the information processing system comprises a plurality of handwriting input terminals, and a data processing center which is communicatively connected with said plurality of handwriting input terminals via a transceiver; wherein, said method includes following steps:
    S1: configuring handwriting recognition module and click position coordinate-key mapping module for said information processing system;
    S2: receiving information about working mode selection of the information processing system, wherein said working mode comprises a handwriting input mode and a click input mode;
    S3: the handwriting input terminal receives and processes handwriting input signals to obtain coordinate information;
    S4: selecting the handwriting recognition module or click position coordinate-key mapping module to transform the coordinate information into corresponding character or key information based on the selected working mode;
    wherein, said step S1 includes:
    configuring a handwriting recognition module at said data processing system, and configuring a configuring corresponding click position coordinate-key mapping module for each of said plurality of handwriting input terminals at said handwriting input terminals;
    said step S4 includes:
    in the case of selecting handwriting input mode, the handwriting input terminal packs and sends said coordinate information and the ID code of the terminal to the data processing center, and the data processing center use the handwriting recognition module to transform said coordinate information into corresponding character;
    in the case of selecting click input mode, the handwriting input terminal use the configured click position coordinate-key mapping module to transform said coordinate information to corresponding key information, and then packs and sends the key information and the ID code of the terminal to the data processing center.

5. A method for processing information in an information processing system, wherein the information processing system comprises a plurality of handwriting input terminals, and a data processing center which is communicatively connected with said plurality of handwriting input terminals via a transceiver; wherein, said method includes following steps:
    S1: configuring handwriting recognition module and click position coordinate-key mapping module for said information processing system;
    S2: receiving information about working mode selection of the information processing system, wherein said working mode comprises a handwriting input mode and a click input mode;
    S3: the handwriting input terminal receives and processes handwriting input signals to obtain coordinate information;

S4: selecting the handwriting recognition module or click position coordinate-key mapping module to transform the coordinate information into corresponding character or key information based on the selected working mode;
wherein, said step Si includes:
configuring a corresponding click position coordinate-key mapping module and a handwriting recognition module for each of said plurality of handwriting input terminals;
said step S4 includes:
in the case of selecting handwriting input mode, the handwriting input terminal use the handwriting recognition module to transform said coordinate information into corresponding character, and then package and send the character together with the ID code of the terminal to the data processing center;
in the case of selecting click input mode, the handwriting input terminal uses the configured click position coordinate-key mapping module to transform said coordinate information into corresponding key information, and packs and sends the key information together with the ID code of the terminal to the data processing center.

* * * * *